United States Patent

[11] 3,584,721

| [72] | Inventors | Edward Lawrence;<br>Christopher J. Goodrick, both of Bromley, England |
|---|---|---|
| [21] | Appl. No. | 829,373 |
| [22] | Filed | June 2, 1969 |
| [45] | Patented | June 15, 1971 |
| [73] | Assignee | Electronic Autosizing Metrology Limited<br>Bromley, England |

[54] INCREMENTAL FINE AND COARSE FEED DRIVE SYSTEM
7 Claims, 3 Drawing Figs.

[52] U.S. Cl. ................................................ 192/142,
74/117, 74/119, 77/32.8, 90/11
[51] Int. Cl. .................................................F16d 71/04,
B23b 39/14
[50] Field of Search........................................... 192/142,
145; 74/117, 118, 119; 90/11, 21; 77/32.8

[56] References Cited
UNITED STATES PATENTS
1,897,416  2/1933  Baum ............................. 74/117

| 2,495,312 | 1/1950 | Bickel et al. ............... | 77/32.8 (X) |
| 2,521,711 | 9/1950 | Galliano ...................... | 74/117 (X) |
| 2,538,619 | 1/1951 | Friedman ..................... | 74/119 |
| 2,737,278 | 3/1956 | Bartelt .......................... | 192/142 |

*Primary Examiner*—Allan D. Herrmann
*Attorney*—Karl F. Ross

ABSTRACT: This invention relates to an incremental drive system comprising a first electromagnetic clutch arranged to have its input connected to a drive motor and having its output connected to the input of an electrically trippable clutch, electrical means for deenergizing the trippable clutch after a predetermined whole number of revolutions thereof, the output of the trippable clutch being arranged to drive an eccentric cam connected through a mechanical linkage to an output shaft so that one revolution of the output of the trippable clutch causes angular rotation of the output shaft through a predetermined angle less than 360°, the output shaft being connectable to a lead screw.

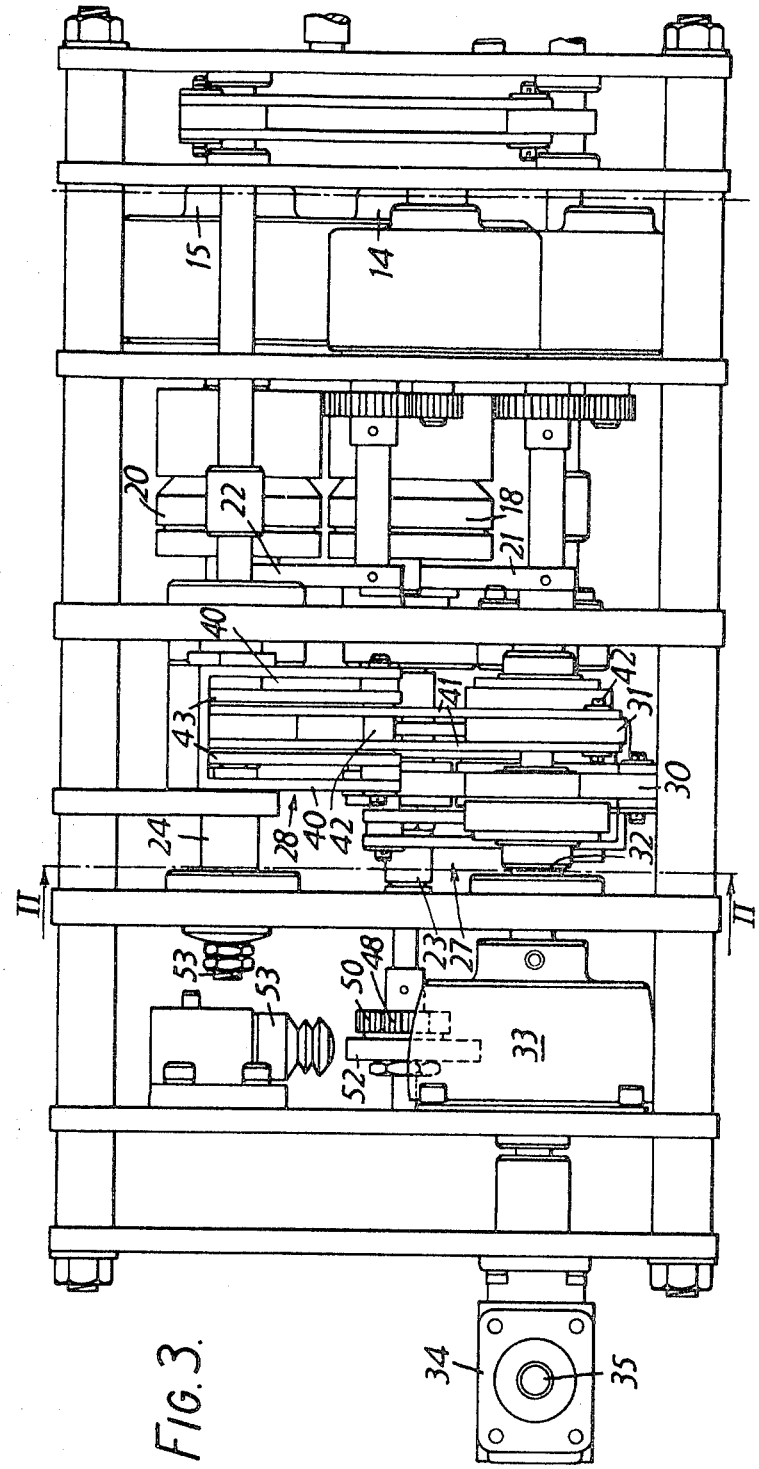

INCREMENTAL FINE AND COARSE FEED DRIVE SYSTEM

BACKGROUND OF THE INVENTION

This invention relates to an incremental drive system particularly such a system capable of automatically applying an incremental linear feed via a lead screw.

Timing systems and quick acting clutches cannot be used for microdimensional linear movement because of overshoot due to variations in time with respect to energization and deenergization, and also drag and slip, A gearing is of no help as it only slows down response time. SUMMARY OF INVENTION The present invention provides an incremental drive system comprising a first electromagnetic clutch arranged to have its input connected to 2 drive motor and having its output connected to the input of an electrically trippable clutch, electrical means for deenergizing the trippable clutch after a predetermined whole number of revolutions thereof, the output of the trippable clutch being arranged to drive an eccentric cam connected through a mechanical linkage to an output shaft so that one revolution of the output of the trippable clutch causes angular rotation of the output shaft through a predetermined angle less than 360°, the output shaft being connectable to a lead screw.

Preferably the mechanical linkage is adjustable to vary the predetermined angle of rotation of the output shaft.

Two such drive systems may be arranged in parallel for coarse and fine incremental drive respectively, the first electromagnetic clutch of each system being connected to the drive motor, and the output side of the mechanical linkage of each system being coupled to the output shaft through an associated free wheel clutch.

In one form of this arrangement the electrically trippable clutch of the coarse drive is arranged to be deenergized after two revolutions while the trippable clutch of the fine drive is deenergized after a single revolution. In addition, the predetermined angle through which the output shaft is rotated for each revolution of the coarse drive is greater than the angle through which it is rotated by each revolution of the fine drive. The lead screw may be connected to the output shaft through a further electromagnetic clutch.

Such a drive system has no gears and therefore a fast response time and the type of clutches used reduces any slip. The indexing provided is infinitely variable and enables incremental angular rotation to be maintained within say 10 percent of the preselected value.

One embodiment of drive system in accordance with the invention will now be described by way of example only with reference to the accompanying drawings of which:

BRIEF DESCRIPTION OF THE DRAWINGS

FIG. 3 is a third angle projection of the drive system.

DESCRIPTION OF THE PREFERRED EMBODIMENT

Figure 1:
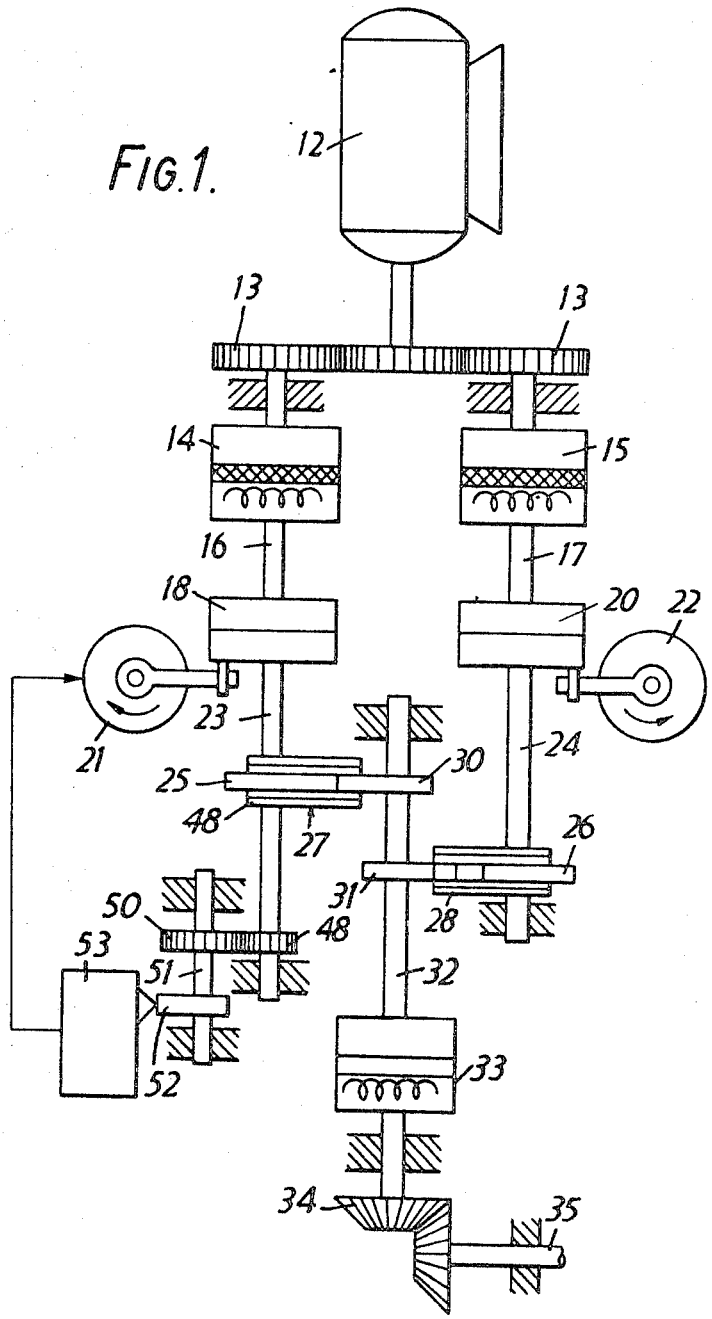
FIG. 1 is a schematic drawing of the system.
Figure 2:
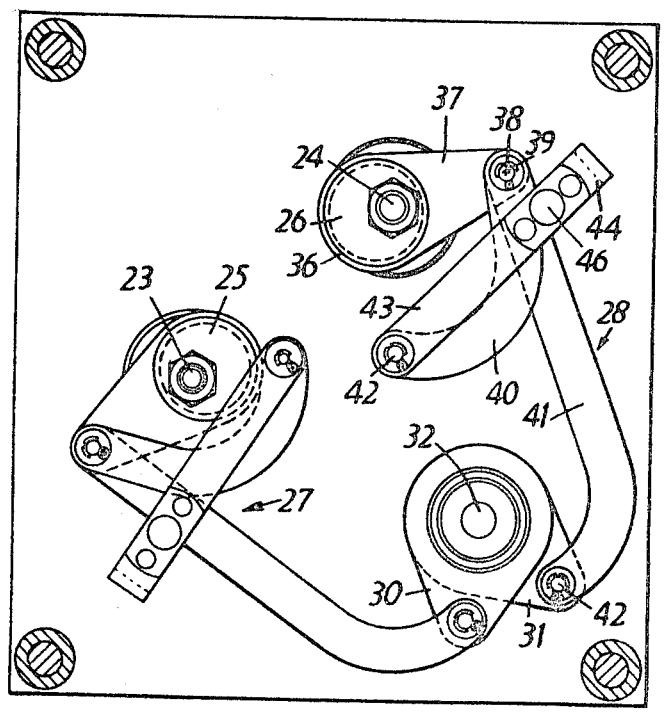
FIG. 2 is a section on the line II–II of FIG. 3 showing the mechanical linkages of the drive system.

Referring to FIG. 1, an electric motor 12 is connected via gears 13 to the inputs of two electromagnetic clutches 14 and 15. The outputs of clutches 14 and 15 are connected via shafts 16, 17 to the inputs of electrically trippable clutches 18, 20 respectively. The clutches 18 and 20 are arranged to be electrically tripped by rotary trip solenoids 21, 22 and when such solenoids are tripped the clutches are arranged to drive shafts 23, 24 respectively. The shafts 23, 24 drive eccentric cams 25, 26 respectively connected by respective mechanical linkages 27, 28 to respective freewheel clutches 30, 31, carried on a common output shaft 32. The output shaft 32 is connected through an electromagnetic clutch 33 to a right-angled bevelled gear drive 33 the output 34 of which is arranged to drive a lead screw (not shown).

The mechanical linkage 27 and 28 are similar so that only link mechanism 28 will be described. Cam 26 is circular and is located in a circular bore 36 at one end of a connecting link 37 the other end of which carries a pivot pin 38 having an axis 39 parallel to the axis of shaft 23. Further curved links 40 and 41 each have one end rotatably carried on the pivot pin 38. Link 40 has its other end pivotally coupled about by a pivot pin 42 parallel to the axis 39 to a straight arm 43 the other end 44 of which is locked in position to control the path of the pin 38. The other end of link 41 is pivotally connected by a pivot pin 42 extending parallel to the axis 39 to the freewheel clutch 31. The system is such that one revolution of the cam 26 corresponding to one revolution of the output of the trippable clutch 20 imparts a predetermined angular motion, less than 360° to the output shaft 32. While during use the end 44 of the arm 43 is locked in position to control the path of pivot pin 38 and thus the predetermined angle through which the output shaft is rotated, this arm can be unlocked and rotated about axis 46 so as to alter the path of pin 38 and thus the angular motion of the freewheel clutch 31. By setting the arms 43 of the two mechanical linkages 27, 28 to different settings, different angular movements are imparted to the output shaft depending upon which of the eccentric cams 25 and 26 is rotated.

The trippable clutches 18 and 20 are basically single revolution clutches, that is they are normally deenergized by the solenoids 21 and 22 after a single revolution. However, in the present case where the drive system 14, 16, 18, 21, 23, 25, 27 is intended as a coarse drive and the drive system 15, 17,20, 22, 24, 26, 28, is intended as a fine drive, the shaft 23 carries a gear wheel 48, engaging with a 2 to 1 stepdown, a further gear wheel 50 driving a shaft 51 carrying a cam 52 arranged to operate a microswitch 53. Microswitch 53 controls the solenoid trip 21 so that it does not deenergize the clutch 18 until the microswitch operates. In this way clutch 18 is not deenergized until the cam 25 has made two revolutions. Clearly, by altering the reduction gearing between gear wheels 48 and 50 any number of revolutions of the cam 25 may be made before the clutch 18 is deenergized.

In operation, with the electric motor 12 running the input ends of the clutches 14 and 15 rotate, but as coils are not energized the electrical trippable clutches remain stationary. Clutch 33 is then energized so that any motion of the freewheel clutches 30 and 31 are imparted to the lead screw via the right-angle drive 34. Clutch 14 is then energized and the input side of the clutch 18 revolves, but the output side remains stationary until the rotary solenoid trip 21 is energized. A signal applied to the rotary solenoid trip 21 will allow the clutch to engage thus revolving cam 25 and imparting a predetermined angular motion to freewheel clutch 30 via the mechanical linkage 27. Clutch 18 is deenergized after two revolutions of cam 25. After the desired number of coarse feed increments have been applied to the lead screw by repeated tripping of solenoid 21, clutch 14 is deenergized and clutch 15 is energized and the fine feed is applied in the same manner as the coarse feed, except that the clutch 20 makes only a single revolution before each deenergization.

FIG. 3 shows the actual construction of the drive system for connection between the motor and the lead screw.

We claim:

1. An incremental drive system comprising:
a drive motor;
an electrically trippable clutch having an input and an output;
a first electromagnetic clutch having an input connected to said drive motor and an output connected to the input of said electrically trippable clutch;
electrical means for deenergizing said trippable clutch after a predetermined whole number of revolutions thereof;
an eccentric cam driven by the output of said trippable clutch;
an output shaft connectable to a load; and
a mechanical linkage connecting said cam to said output shaft for rotating said output shaft through a predetermined angle smaller than 360° in one revolution of the output of the trippable clutch.

2. A drive system as defined in claim 1 wherein said mechanical linkage mans is adjustable to vary said predetermined angle rotation of said output shaft.

3. An incremental drive system comprising in combination:
a drive motor;
an output shaft arranged for connection to a load;
a fine-feed electromagnetic clutch having an output and further having an input connected to said drive motor;
a fine-feed electrically trippable clutch having an output and further having an input connected to the output of said fine-feed electromagnetic clutch;
fine-feed electrical means for deenergizing said fine-feed trippable clutch after a predetermined whole number of revolutions thereof;
a fine-feed eccentric cam drivably connected to the output of said fine-feed trippable clutch;
a fine-feed freewheel clutch connected to the output of said fine-feed trippable clutch;
fine-feed mechanical linkage means connecting said fine-feed cam to said fine-feed freewheel clutch for rotating said output shaft through an angle smaller than 360° in one revolution of the output of said fine-feed trippable clutch;
a coarse-feed electromagnetic clutch having an output and further having an input connected to said drive motor;
a coarse-feed electrically trippable clutch having an output and further having an input connected to the output of said coarse-feed electromagnetic clutch;
coarse-feed electrical means for deenergizing said coarse-feed trippable clutch after a predetermined whole number of revolutions thereof;
a coarse-feed eccentric cam drivably connected to the output of said coarse-feed trippable clutch; a coarse-feed freewheel clutch connected to the output of said coarse-feed trippable clutch; and
coarse-feed mechanical linkage means connecting said coarse-feed cam to said coarse-feed freewheel clutch for rotating said output shaft through a predetermined angle of less than 360° in one revolution of the output of said coarse-feed trippable clutch.

4. A drive system as defined in claim 3 wherein said fine-feed and coarse-feed mechanical linkages are individually adjustable to vary the respective predetermined angles.

5. A drive system as defined in claim 3 wherein said fine-feed electrical means is arranged to deenergize said fine-feed trippable clutch after a single revolution thereof and said coarse-feed electrical means is arranged to deenergize said coarse-feed trippable clutch after two revolutions thereof.

6. A drive system as defined in claim 3 wherein said predetermined angle through which said output shaft is rotated for each revolution of said coarse-feed trippable clutch is greater than said predetermined angle through which said output shaft is rotated for each revolution of said fine-feed trippable clutch.

7. A drive system as defined in claim 3, including a further electromagnetic clutch coupled with said output shaft for connecting same to the load.